J. E. ACKROYD.

MACHINE FOR WASHING WOOL.

No. 6,961. Reissued Feb. 29, 1876.

Witnesses:
Will H. Dodge
Dann Mitchell

Inventor:
C. G. and F. G. Sargent,
assignees of
James E. Ackroyd,
By their atty.
Dodgeston

N. PETERS, PHOTO-LITHOGRAPHER, WASHINGTON, D. C.

UNITED STATES PATENT OFFICE.

JAMES E. ACKROYD, OF PHILADELPHIA, PENNSYLVANIA, ASSIGNOR TO C. G. SARGENT & SON, OF GRANITEVILLE, MASSACHUSETTS.

IMPROVEMENT IN MACHINES FOR WASHING WOOL.

Specification forming part of Letters Patent No. 143,603, dated October 14, 1873; reissue No. 6,961, dated February 29, 1876; application filed January 13, 1876.

*To all whom it may concern:*

Be it known that I, JAMES E. ACKROYD, of Philadelphia, in the county of Philadelphia and State of Pennsylvania, have invented certain new and useful Improvements in Machines for Cleansing Wool; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention I will proceed to describe it.

My invention relates to a novel arrangement of mechanism for feeding the stock or fiber through and out of the fluid-bath or cleansing-mixture; and consists in a reciprocating carrier provided with pivoted teeth, arranged in such manner that, when moving forward, they lock fast and carry the fiber before them, and that, when moving backward, they yield and pass lightly over the fiber; in combining with said carrier fixed teeth to hold the fiber during the backward movement of the carrier, and in details of construction represented in the accompanying drawing, which represents a machine having my improvements embodied therein.

Figure 1:
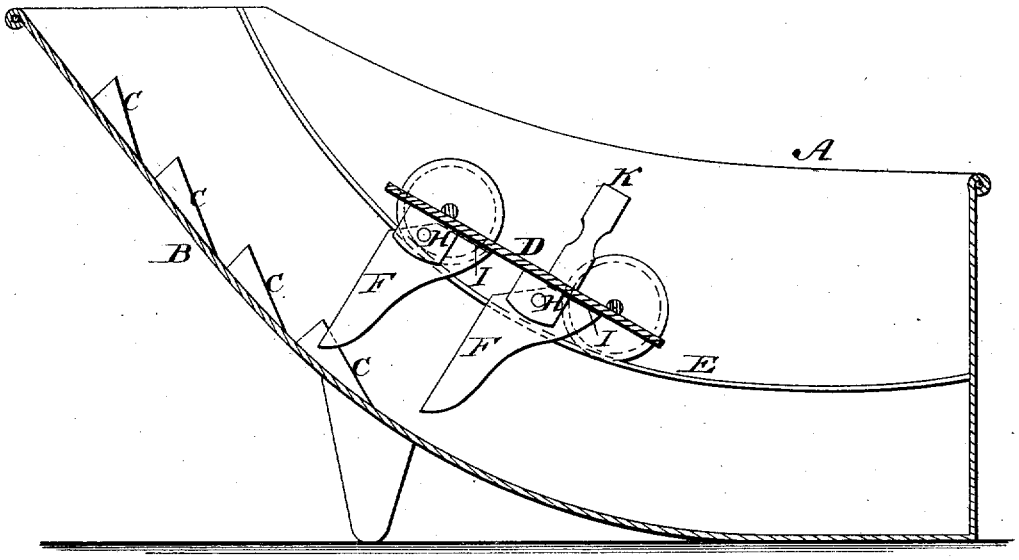
Figure 2:
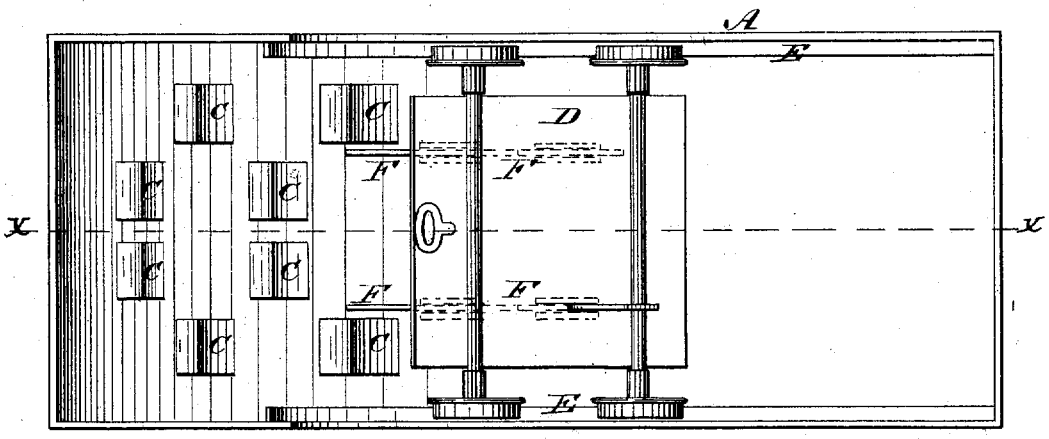

Figure 1 represents a longitudinal vertical section of the machine on the line *x x* of Fig. 2; and Fig. 2, a top plan view of the machine.

A represents the tank or bowl intended to contain the stock or fiber and the fluid with which it is to be treated. B represents the side or end of the tank, forming an inclined continuation of the bottom, and serving as a surface, upon which the fiber can be readily carried up and out of the fluid. C represents blocks or teeth, having vertical front and inclined rear sides secured on the inner face of the inclined side B, for the purpose of preventing a backward movement of the fiber, which can, however, pass readily forward over them. D represents the reciprocating carrier or truck, provided with the pendent teeth F, and arranged to move back and forth above the inner face of the tank. The teeth F are pivoted to the carrier in such manner that they can swing freely forward, but are provided on the rear sides with shoulders I, by which they are prevented from swinging backward. As the carrier or truck advances, the teeth, being held up to their work by the shoulders, carry the fiber before them up the inclined face B, but, as the carrier recedes, the teeth swing forward on their pivots and pass back freely and lightly over the fiber, allowing the fiber to remain at rest during the backward movement of the carrier-teeth, and enabling the latter to operate without breaking or tearing the fiber.

As the carrier-teeth advance the fiber is caught and held from sliding down the inclined face by the teeth C.

In order to render the swinging movement of the teeth a positive one, they may be extended upward above their pivots, as shown at K, to receive an operating motion or device. The carrier or truck may be provided with wheels, running on supporting-rails F, on the inner sides of the tank, or the wheels and rails may be dispensed with, and the carrier arranged to slide on ways, the latter being the better plan when a quick motion is required.

The carrier will, in some cases, be worked by hand, but for factory purposes it will be connected with suitable driving-gear and operated by power.

It is obvious that the yielding carrier-teeth are not dependent for their action upon any special manner of mounting and operating the carrier or truck, the only requirement being that the carrier shall have a reciprocating movement, and that it shall be so arranged that its teeth can engage with the fiber during their advance.

The main feature of my invention is the employment of carrier-teeth, moving forward and backward, arranged in such manner that they engage with the fiber as they advance, but yield and pass by the same as they move backward.

I am aware that it is common to provide a carrier with rigid teeth, and to lift such carrier bodily during its backward movement in order that its teeth may clear or pass by the fiber, and I do not desire to be understood as claiming the same in this patent, my invention being limited to the use of yielding teeth, which permit the operating parts to be made much cheaper, lighter, and more simple than when the rising carrier is used.

Having thus described my invention, what I claim is—

1. The reciprocating carrier D, provided with yielding teeth F, constructed and arranged to operate substantially as shown and described.

2. The combination of the stationary teeth C and the reciprocating carrier D, provided with yielding feeding-teeth F, substantially as shown and described.

3. In combination with the reciprocating carrier D, the teeth F, pivoted thereto and provided with the rear supporting-shoulders I.

4. In a wool-washing machine, the combination of the following elements, namely, a tank or bowl to contain the liquid and the fiber, an inclined surface, upon which the fiber may be carried from the fluid, and a series of reciprocating carrier-teeth, arranged to engage with the fiber as they advance, and to pass freely over the same as they recede.

JAMES E. ACKROYD.

Witnesses:

GEO. W. WARD,
NICHOLAS SHANE.